US011918151B2

(12) United States Patent
Dilworth

(10) Patent No.: US 11,918,151 B2
(45) Date of Patent: Mar. 5, 2024

(54) COFFEE STORAGE CONTAINER

(71) Applicant: Michael Dilworth, Oregon City, OR (US)

(72) Inventor: Michael Dilworth, Oregon City, OR (US)

( * ) Notice: Subject to any disclaimer, the term of this patent is extended or adjusted under 35 U.S.C. 154(b) by 263 days.

(21) Appl. No.: 17/404,877

(22) Filed: Aug. 17, 2021

(65) Prior Publication Data
US 2023/0056014 A1  Feb. 23, 2023

(51) Int. Cl.
| A47J 47/01 | (2006.01) |
| A47J 47/06 | (2006.01) |
| A47J 47/10 | (2006.01) |
| B65D 83/00 | (2006.01) |
| G01F 11/24 | (2006.01) |

(52) U.S. Cl.
CPC .............. *A47J 47/01* (2013.01); *A47J 47/06* (2013.01); *A47J 47/10* (2013.01); *B65D 83/0083* (2013.01); *G01F 11/24* (2013.01); *A47J 2203/00* (2013.01)

(58) Field of Classification Search
CPC . A47J 47/01; A47J 47/06; A47J 47/10; B65D 83/0083; G01F 11/24
See application file for complete search history.

(56) References Cited

U.S. PATENT DOCUMENTS

| 4,961,521 | A | * | 10/1990 | Eckman | A47G 19/24 222/545 |
| 5,178,300 | A | * | 1/1993 | Haviv | B65D 83/0072 222/105 |
| 5,588,563 | A | * | 12/1996 | Liu | G01F 11/261 222/158 |
| 7,748,579 | B1 | * | 7/2010 | Shin | B65D 83/06 222/548 |
| 2015/0041500 | A1 | * | 2/2015 | Ismail | G01F 11/268 222/452 |
| 2015/0083758 | A1 | * | 3/2015 | Ismail | A47J 47/01 222/454 |
| 2020/0141779 | A1 | * | 5/2020 | Jangsäter | G01F 11/282 |

* cited by examiner

*Primary Examiner* — Jeremy Carroll
(74) *Attorney, Agent, or Firm* — Fenwick & West LLP

(57) ABSTRACT

A coffee storage container provides for the removal of coffee without introducing air into the remaining coffee within the container. The container includes a container body defining an internal chamber, a dispenser, and a floating ceiling. The dispenser includes a top side located within the internal chamber that provides a resting surface for coffee stored in the internal chamber. The dispenser dispenses the coffee through a bottom side of the dispenser. The floating ceiling is located within the internal chamber above the dispenser. The floating ceiling rests on the coffee stored in the internal chamber and moves downwards with a top level of remaining coffee in the internal chamber as the coffee is dispensed through the bottom side of the dispenser. The floating ceiling and the top side of the dispenser define a storage space for the coffee that decreases in volume as the coffee is dispensed by the dispenser.

18 Claims, 14 Drawing Sheets

FIG. 5A  FIG. 5B

COFFEE STORAGE CONTAINER

TECHNICAL FIELD

The disclosure generally relates to a coffee storage container, and more specifically to a coffee storage container that keeps coffee fresher for longer.

BACKGROUND

Coffee's number one enemy is oxygen. Oxygen oxidizes the oils in the coffee and can make the oil rancid, and also degrades volatile aromatic components resulting in the coffee tasting stale. Like fresh baked bread, coffee should be sealed away from outside air to protect it from becoming stale. Other flavor killers for coffee include humidity and light. Conventional coffee storage containers flush coffee with new outside air (as well as humidity and light) each time their containers are opened to remove stored coffee from the containers.

SUMMARY

Example embodiments relate to a coffee storage container that provides for the removal of coffee without introducing air into the remaining coffee within the container. The container includes a container body defining an internal chamber, a dispenser, and a floating ceiling. The dispenser includes a top side located within the internal chamber that provides a resting surface for coffee stored in the internal chamber. The dispenser dispenses the coffee through a bottom side of the dispenser. The floating ceiling is located within the internal chamber above the dispenser. The floating ceiling rests on the coffee stored in the internal chamber and moves downwards with a top level of remaining coffee in the internal chamber as the coffee is dispensed through the bottom side of the dispenser. The floating ceiling and the top side of the dispenser define a storage space for the coffee that decreases in volume as the coffee is dispensed by the dispenser.

BRIEF DESCRIPTION OF THE DRAWINGS

FIGS. 5A, 5B, and 5C show dispensing of coffee by the coffee storage container, in accordance with one or more embodiments.

Figure 1A:
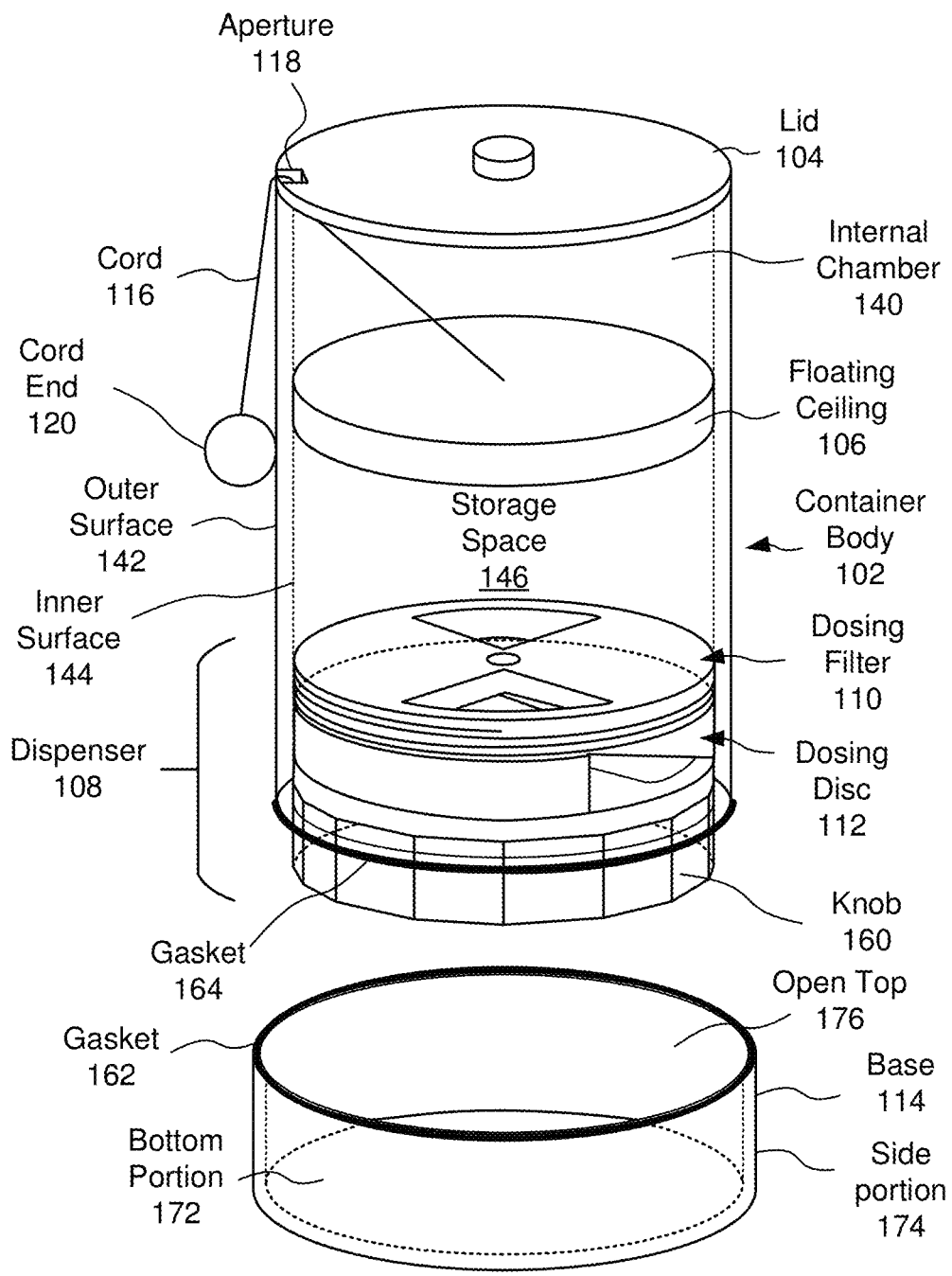
FIG. 1A shows a perspective view of a coffee storage container, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a coffee storage container that dispenses coffee (e.g., beans or grounds) without introducing air into the remaining stored coffee. In addition to air (e.g., oxygen), the coffee storage container may also keep out other flavor killers such as humidity and light into the remaining stored coffee. The coffee storage container includes a container body defining an internal chamber, a dispenser at the bottom of the coffee storage container, and a floating ceiling above the dispenser within the internal chamber. The dispenser provides a resting surface for the coffee stored in the internal chamber and dispenses the coffee (e.g., in measured doses) through a bottom side of the dispenser. The floating ceiling rests on the coffee stored in the internal chamber and moves downwards (e.g., via force of gravity) with the top level of remaining coffee in the internal chamber as the coffee is dispensed through the dispenser. The floating ceiling may have a snug fit with the inner surface of the container body to create an air seal within the storage space. The floating ceiling and the top side of the dispenser define a storage space for the coffee that decreases in volume as coffee is dispensed.

The coffee storage container dispenses coffee without exposing stored coffee to outside air and humidity. It does not require using a measuring spoon or taking on and off a lid to dispense the coffee. As such, the coffee storage container prevents airflow into the storage space as the coffee is dispensed by the dispenser. The coffee storage container also prevents light from being introduced into the stored coffee when the dispensing occurs. The container body may be opaque to prevent light from entering the storage space where the coffee is stored and does not need to be opened during the dispensing such that light does not enter the storage space during the dispensing. The coffee storage container keeps air, humidity, and light from being introduced to the stored coffee before, during, and after dispensing. The coffee storage container keeps stored coffee fresher, tastier, and healthier for a longer period.

Figure 1B:
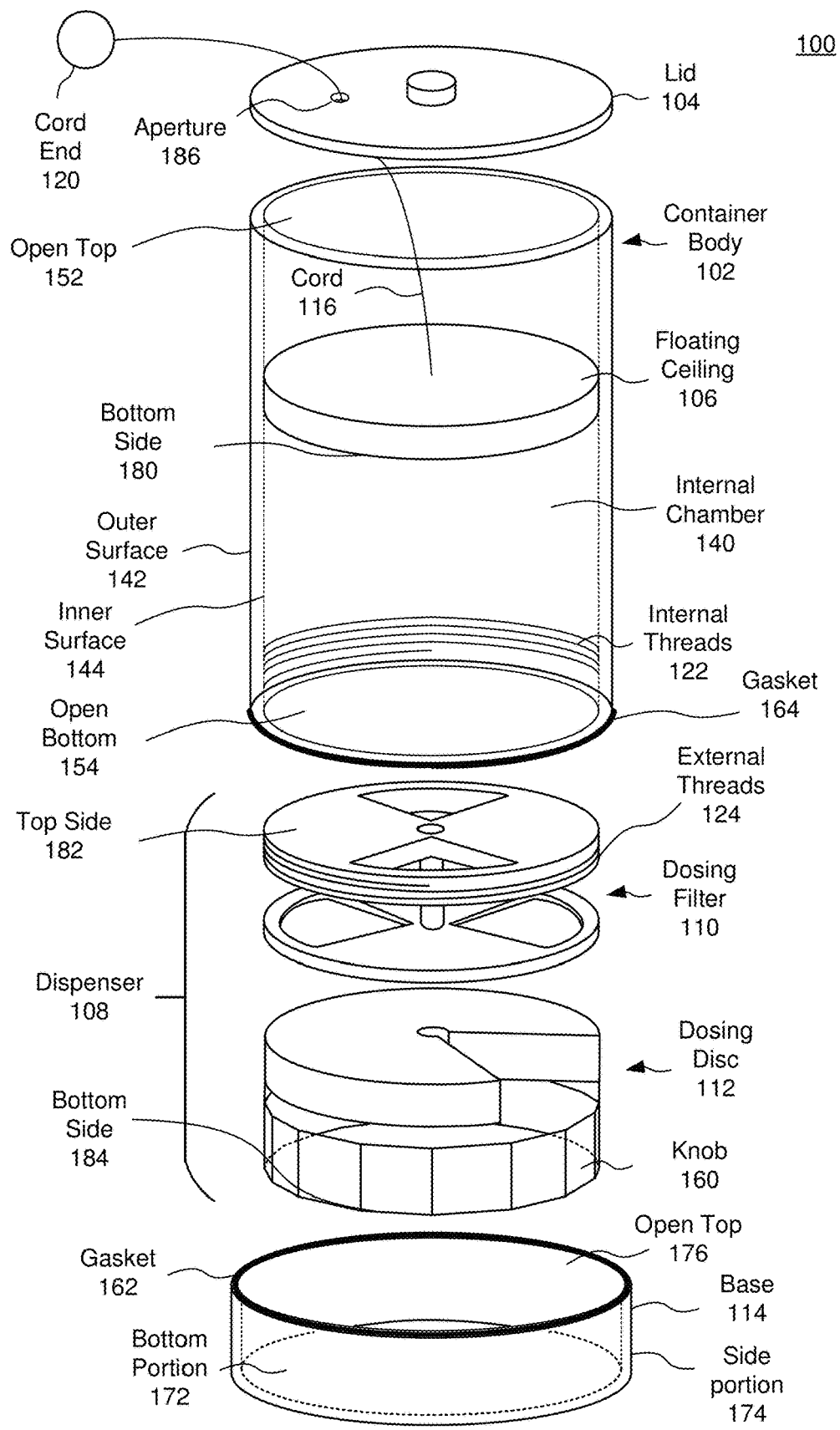
FIG. 1B shows an exploded perspective view of the coffee storage container, in accordance with one or more embodiments.

FIG. 1A shows a perspective view of a coffee storage container 100 and FIG. 1B shows an exploded perspective view of the coffee storage container 100, in accordance with one or more embodiments. The coffee storage container 100 includes a container body 102, a lid 104, a floating ceiling 106, a dispenser 108 including a dosing filter 110 and a dosing disc 112, and a base 114. Some embodiments of the coffee storage container 100 may include components different from those describe here.

The container body 102 defines an internal chamber 140 for storing coffee. The container body 102 may include a hollow cylindrical shape. The container body 102 has an outer surface 142 and an inner surface 144. The inner surface 144 defines the internal chamber 140. The surfaces 142 and 144 further define an open top 152 and an open bottom 154 of the container body 102. The dispenser 108 is located at a bottom side of the container body 102, with a portion of the dispenser 108 (including top side 182) being inserted through the open bottom 154 and within the internal chamber 140. The floating ceiling 106 is located within the internal chamber 140 and above the dispenser 108. Coffee is stored in a variably sized storage space 146 defined at the sides by the internal surface 144 of the container body 102, at the top by a bottom side 180 of the floating ceiling 106, and at the bottom by a top side 182 of the dispenser 108. The container body 102 may be opaque to prevent light from entering the internal chamber 140 and reaching the coffee stored in the storage space 146.

The floating ceiling 106 is located within the internal chamber 140 above the dispenser 108. The floating ceiling rests over a top level of the coffee stored in the storage space 146 and moves downwards (e.g., via force of gravity) with the top level of the remaining coffee in the internal chamber 140 as the coffee is dispensed through the dispenser 108. The floating ceiling 106 may create an air seal within the storage space 146 and the downwards movement of the floating ceiling 106 prevents airflow into the storage space 146 when the coffee is dispensed by the dispenser 108. As such, the bottom side 180 of the floating ceiling 106 and the top side 182 of the dispenser 108 define a variable storage space 146 for the coffee that decreases in volume as coffee is dispensed by the dispenser. Because there is no excess volume in the storage space 146 as coffee is dispensed, outside air does not enter the storage space 146 to fill the volume left by dispensed coffee, thus reducing contact between the coffee within the storage space 146 and the outside air.

The floating ceiling 106 is sized to create a snug fit within the internal chamber 140 to reduce or prevent air flow, but also allows for sliding (e.g., up or down) within the internal chamber 140. The floating ceiling 106 may include a cylindrical shape to provide the snug fit with the inner surface 144 of the container body 102. The floating ceiling 106 may include a solid piece of polymer material (e.g., plastic). The floating ceiling 106 may be between 0.75 to 1 inch thick. In one example, the floating ceiling 106 is 0.75 inches thick. The floating ceiling 106 may weigh between 4 and 5 ounces. The floating ceiling 106 may place a downward force on the coffee to facilitate with the dispensing of the coffee at the bottom of the coffee storage container 100. The downward force exerted by the floating ceiling 106 may also compress the coffee (e.g., beans) within the storage space 146 to minimize air between the coffee. The downward force may be provided by gravity and the weight of the floating ceiling 106 and/or may be provided manually by a user.

The cord 116 and cord end 120 provides a coffee level indicator for the coffee in the storage space 146. The coffee level indicator provides an indication of the level of coffee within the storage space 146 without requiring removal of the lid 104. The container body 102 may be opaque to prevent light from entering the storage space 146 and interacting with the coffee. A first end of the cord 116 is attached to the floating ceiling 106. The cord 116 is passed through an aperture 118 of the lid 104 to extend outside of the container body 102. The cord end 120 that is attached to a second end of the chord 116 and rests against the outer surface 142 of the container body 102. As the floating ceiling 106 moves down with the top level of the coffee in the storage space 146, the cord end 120 moves up. As such, the cord end 120 indicates the amount of remaining coffee in the internal chamber. The cord 116 may also be pulled to remove the floating ceiling 106, such as when refiling the beans. The cord 116 may be made of various types of materials. In some embodiments, the cord 116 may be a silicone cord. In some embodiments, the cord 116 may be color coded to indicate the coffee level. For example, a first portion (e.g., ⅔) of the cord 116 nearest to the floating ceiling 106 may be a first color (e.g., green) and a second portion (e.g., ⅓) of the cord 116 at the opposite end may be a second color (e.g., red). When only the second color is visible, then this indicates that the coffee storage container 100 should be refilled.

In some embodiments, the aperture of the lid 104 is located along a side edge of the lid 104, as shown by the aperture 118 in FIG. 1A. This allows the lid 104 to be taken on and off without the cord 116 being attached. In other embodiments, the aperture of the lid 104 is located away from the side edge, as shown by the aperture 186 in FIG. 1B.

The dispenser 108 dispenses coffee stored in the storage space 146 from a bottom side 184 of the coffee storage container 100. The dispenser 108 may be configured to dispense doses of coffee. For example, the dosing disc 112 may include a knob 160 that is turned (e.g., with respect to the dosing filter 110) to dispense a dose of the coffee stored in the storage space 146 through the dispenser 108. A dose of coffee, as used herein, refers to a consistent or substantially consistent amount of coffee. In some embodiments, each dose includes a tablespoon of coffee. The inner surface 142 of the container body 102 includes internal threads 122 and the dispenser 108 (e.g., dosing filter 110) includes external threads 124 to allow the dispenser 108 to be screwed into the internal chamber 140 of the container body 102. The dosing filter 110 is then locked into place while the dosing disc 112 can continue to turn freely. When the dispenser 108 is attached to the container body 102, at least a portion of the knob 160 extends below the open bottom 154 of the container body 102 through which the dispenser 108 is inserted to allow a user to turn the knob 160 for dispensing the coffee.

Via the dispensing of the coffee at the bottom side 184 of the coffee storage container 100 by the dispenser 108, the lid 104 at the top of the container body 102 does not need to be opened to dispense the coffee. Furthermore, the dispenser 108 may prevent airflow into the storage space 146 when the coffee is dispensed by the dispenser 108. Additional details regarding the operation of the dispenser 108 are discussed in connection with FIGS. 6A through 6C, and 7A through 7F, and 8A through 8D.

The base 114 attaches at the bottom side of the container body 102 when the coffee storage container 100 is not in uses. The base 114 keeps carbon dioxide (e.g., which is one of the heavier components of air) from leaking out of the bottom of the coffee storage container 100 to avoid creating a vacuum condition in the internal chamber 140 that pulls in outside oxygen and humidity. The base 114 has a bottom portion 172, a side portion 174 and an open top 176. The container body 102 sits in the base 114 and the bottom portion 172 of the base 114 covers the bottom of the dispenser 108 when the coffee storage container 100 is not in use. The base 114 may include a gasket 162 around the open top 176 to form an air seal against the outer surface 142 of the container body 102. The gasket 162 of the base 114 prevents outside oxygen and humidity from entering, while allowing excess pressurized carbon dioxide from the degassing of the beans to escape (which can happen for a week or more after roasting). The container body 102 may also include a gasket 164 around the outer surface 142 near the open bottom 154 of the container body 102 to form an air seal against the inner surface of the side portion 174 of the base 114. The gaskets 162 and 164 may include a polymer material, such as rubber. To dispense coffee, the base 114 is detached from the container body 102 to expose the dispenser 108 and knob 160.

Figure 2:
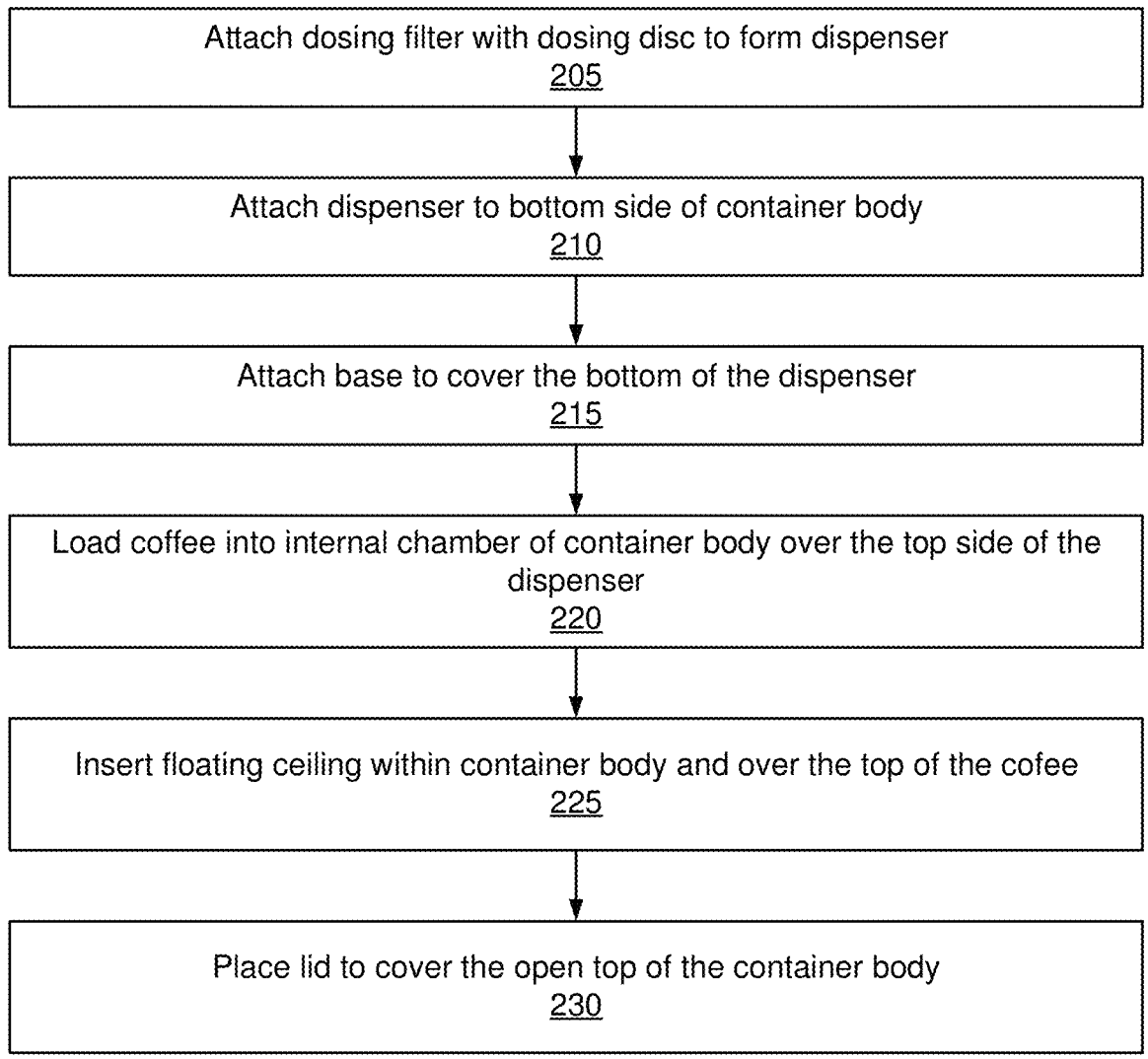
FIG. 2 is a flowchart of a process for assembling the coffee storage container, in accordance with one or more embodiments.

FIG. 2 is a flowchart of a process for assembling the coffee storage container 100, in accordance with one or more embodiments. The coffee storage container 100 may be assembled from multiple components or disassembled into the components, such as for cleaning purposes. The process may include fewer or additional steps, and steps may be performed in different orders.

The dosing filter 110 is attached 205 with the dosing disc 112 to form the dispenser 108. The dispenser 108 is attached 210 to the bottom side of the container body 102. For example, the external threads 124 of the dispenser 108 may be used to screw the dispenser 108 into the internal threads 122 of the container body 102. The base 114 is attached 215 to cover the bottom of the dispenser 108. Coffee may be loaded 220 into the internal chamber 140 and sit on the top side of the dispenser 108. The floating ceiling 106 is inserted 225 within the container body and over the top of the coffee. The lid 104 is placed 230 to cover the open top 152 of the container body 102.

Figure 3:
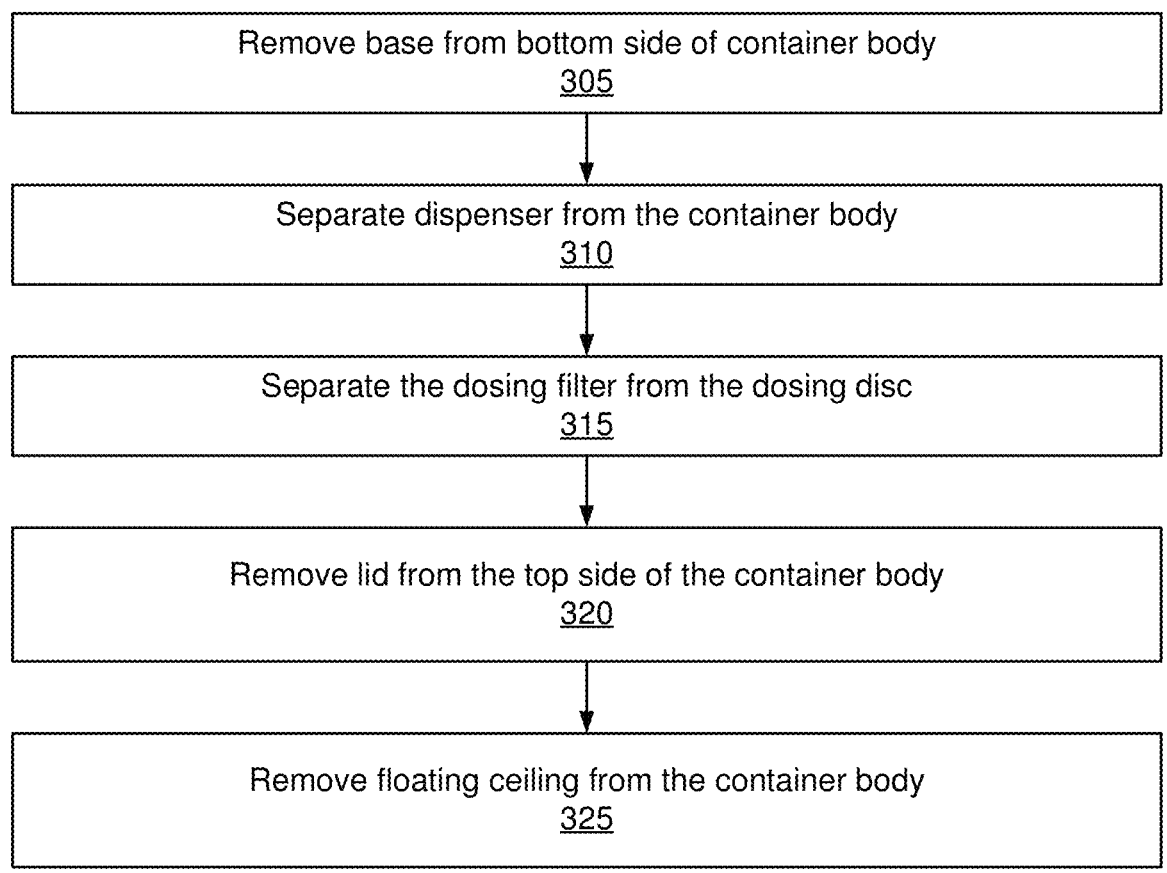
FIG. 3 is a flowchart of a process for disassembling the coffee storage container, in accordance with one or more embodiments.

FIG. 3 is a flowchart of a process for disassembling the coffee storage container 100, in accordance with one or more embodiments. The process may include fewer or additional steps, and steps may be performed in different orders.

The base 114 is removed 305 from the bottom side of the container body 102. This exposes the bottom side of the dispenser 108. The dispenser 108 is separated 310 (e.g., unscrewed) from the container body 102. The dosing filter 110 of the dispenser 108 may be separated 315 from the dosing disc 112 of the dispenser 108. Separating the dosing filter 110 from the dosing disc 112 facilitates cleaning of the dispenser 108. The lid 104 is removed 320 from the top of the container body 102. The floating ceiling 106 is removed 325 from the container body. The disassembled components of the coffee storage container 100 may be cleaned and reassembled.

Figure 4:
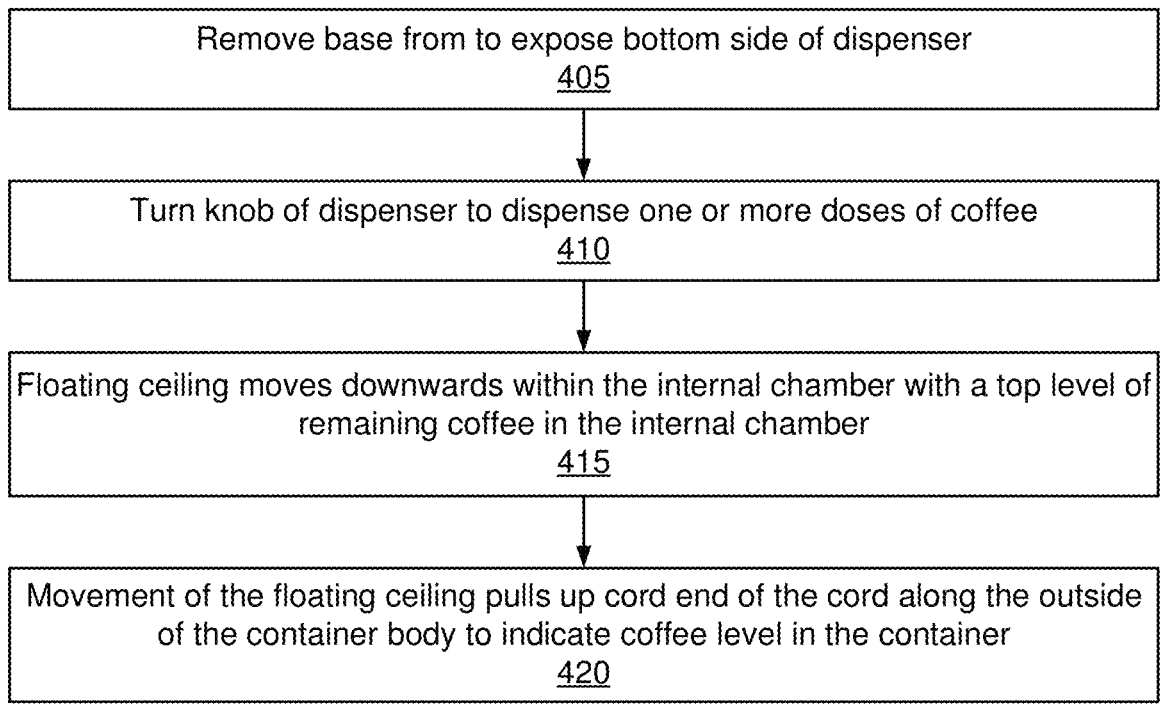
FIG. 4 is a flowchart of a process for dispensing coffee by the coffee storage container, in accordance with one or more embodiments

FIG. 4 is a flowchart of a process for dispensing coffee by the coffee storage container 100, in accordance with one or more embodiments. The process may include fewer or additional steps, and steps may be performed in different orders.

The base 114 is removed 405 from the coffee storage container 100 to expose the bottom side of the dispenser 108. The knob 160 of the dispenser 108 is turned 410 to dispense one or more doses of coffee. The coffee is dispensed from the storage space 146 within the container body 102, through the dosing filter 110 and dosing disc 112 of the dispenser 108, and out of the bottom side of the coffee storage container 100. The size of each dose and the number of doses that are dispensed per turn of the knob 160 may vary depending on the design of the dispenser 108. In some embodiments, each half turn of the knob 160 results in a dose of the coffee being dispensed. In other embodiments, each full turn of the knob 160 results in a dose of the coffee being dispensed.

The coffee stored in the coffee storage container 100 and dispensed may include coffee beans or coffee grounds. Coffee beans may be dispensed into a coffee grinder to make coffee grounds, and then the coffee grounds may be placed in a coffee machine to brew the coffee. Coffee grounds may be dispensed directly into a coffee machine.

The floating ceiling 106 moves 415 downwards within the internal chamber 140 (e.g., via the force of gravity) with a top level of remaining coffee in the internal chamber 140. As the dose of the coffee leaves the internal chamber 140, the top of the remaining coffee in the internal chamber 140 becomes lower and the floating ceiling 106 that sits on the top of the remaining coffee drops with the top of the remaining coffee. The downward movement of the floating ceiling 106 reduces the size of the storage space 146 of the internal chamber 140. This ensures that the removal of the one or more doses of coffee from the internal chamber 140 does not create an open region or vacuum in the storage space 146 where air (e.g., including oxygen and humidity) can enter.

With the downward movement of the floating ceiling 106 within the internal chamber 140, the cord end 120 of the cord 116 is pulled up 420 along the outside of the container body 102 to indicate coffee level in the container 100. If the container body 102 is opaque (e.g., to prevent light from reaching the coffee within the storage space 146), the amount of coffee remaining in the storage space 146 cannot be directly observed through the container body 102. As such, the cord end 120 indicates the amount of coffee that is remaining in the storage space 146. The higher the cord end 120 is pulled toward the top of the container body 102, the lower the amount of remaining coffee. In some embodiments, the cord 116 is color coded such that if only one color (e.g., red) is visible, this indicates that it is time to refill.

The process may be repeated to dispense multiple doses of the coffee. The coffee storage container 100 may be refilled with coffee after the remaining coffee has been dispensed.

Figure 5C:
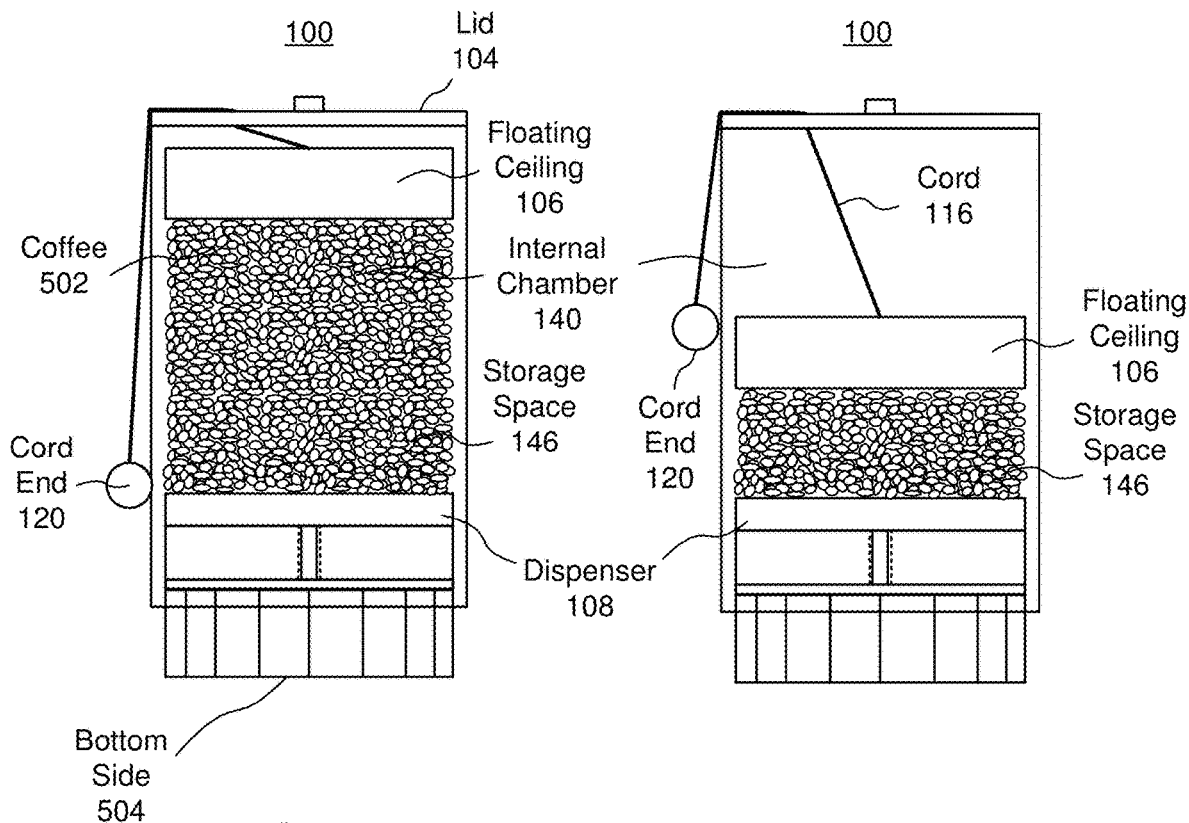
Figure 5C:
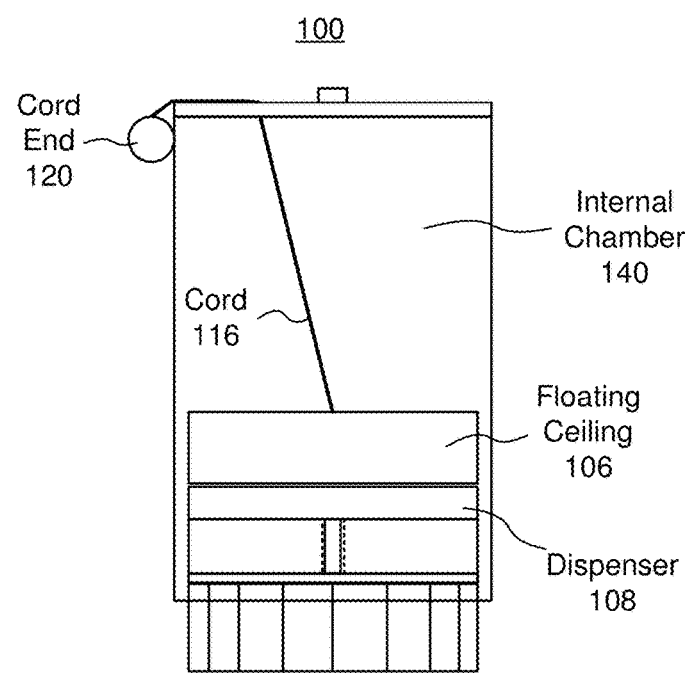

FIGS. 5A, 5B, and 5C show dispensing of coffee by the coffee storage container 100, in accordance with one or more embodiments. In FIG. 5A, the coffee storage container 100 is filled with coffee 502. The floating ceiling 106 sits at the top of the coffee 502. The cord end 120 is at a low height to indicate the high level of coffee 502 in the container 100. Doses of the coffee 502 may be dispensed from the bottom side 504 of the container 100.

In FIG. 5B, a portion (e.g., about half) of the coffee 504 has been dispensed from the container 100. The floating ceiling 106 moves down with the lower height of the coffee 502 in the internal chamber 140. The movement of the floating ceiling 106 results in the storage space 146 being reduced in accordance with the lower amount of coffee 502 in the internal chamber 140. This prevents air or humidity from entering the storage space 146 where the remaining coffee 502 is stored. The cord end 120 is at an intermediate height to indicate the level of coffee 502 remaining in the container.

In FIG. 5C, the coffee 502 has been dispensed from the container 100. The floating ceiling 106 has moved down to the top of the dispenser 108. The cord end 120 is at a high level to indicate that there is no more coffee 502 in the internal chamber 140.

Figure 6A:
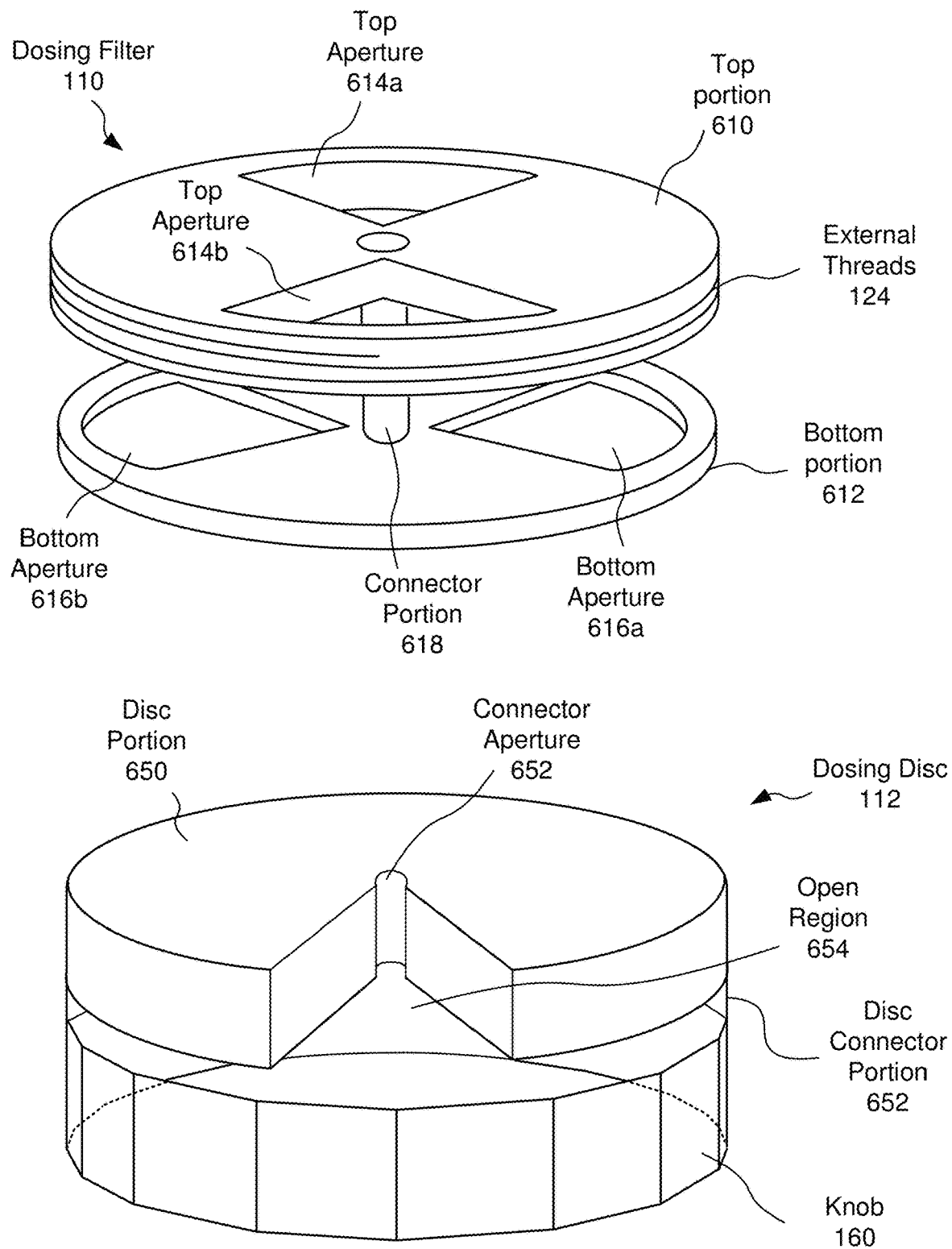
FIG. 6A shows a perspective view of a dosing filter separated from a dosing disc, in accordance with one or more embodiments.
Figure 6B:
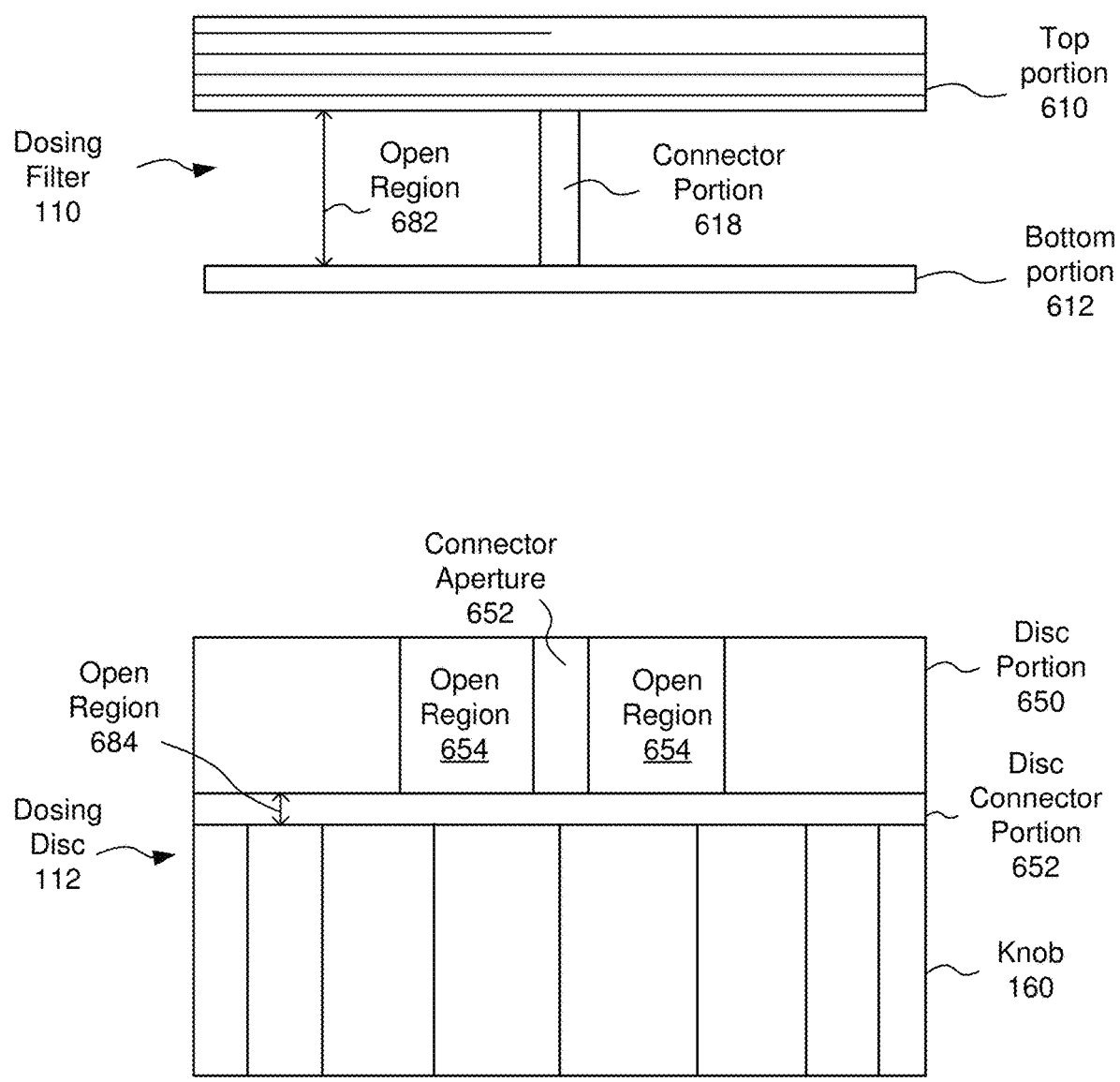
FIG. 6B shows a side view of the dosing filter separated from the dosing disc, in accordance with one or more embodiments.
Figure 6C:
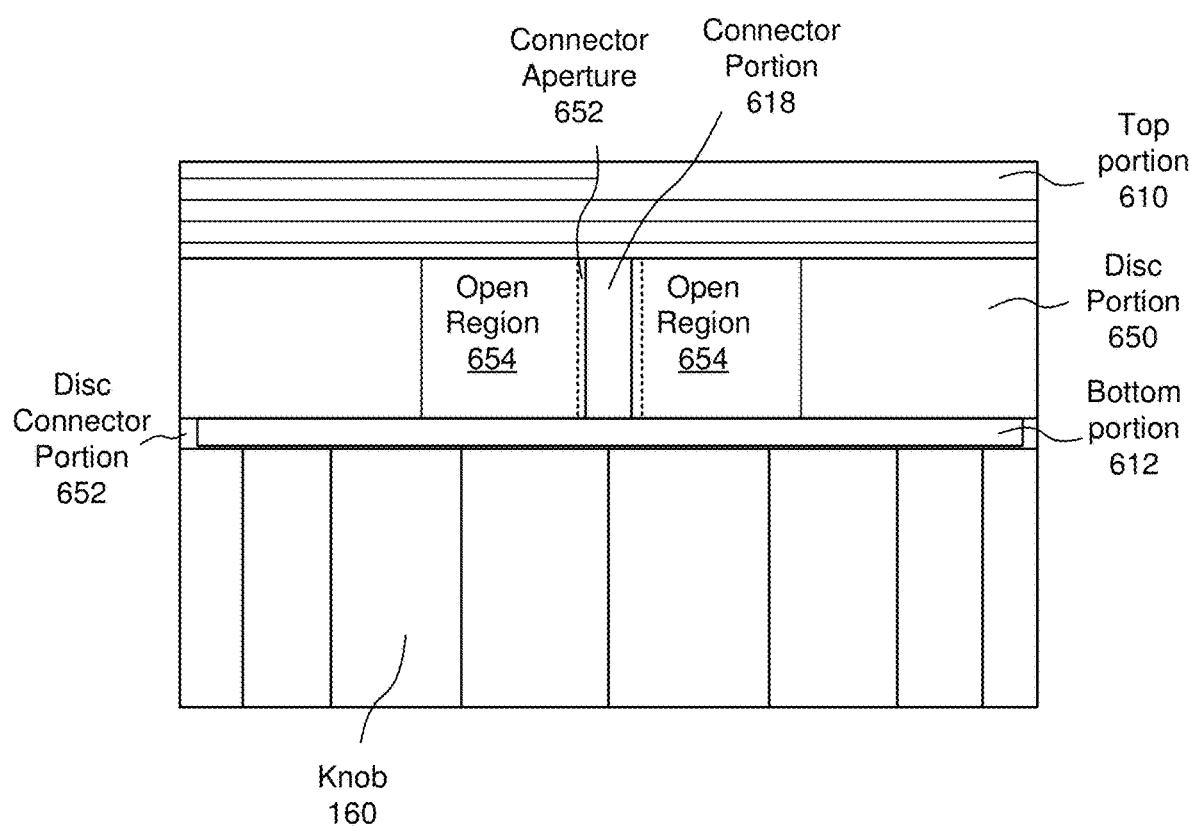
FIG. 6C shows a side view of the dosing filter combined with the dosing disc to form a dispenser, in accordance with one or more embodiments.

FIG. 6A shows a perspective view of the dosing filter 110 separated from the dosing disc 112, FIG. 6B shows a side view of the dosing filter 110 separated from the dosing disc 112, and FIG. 6C shows a side view of the dosing filter 110 combined with the dosing disc 112 to form the dispenser 108, in accordance with one or more embodiments. The dosing filter 110 includes a top portion 610, a bottom portion 612, and a connector portion 618 that connects the top portion 610 and the bottom portion 612. The top portion 610 and bottom portion 612 may each include a cylindrical shape, with the external threads 124 on the side surface of the top portion 610.

The connector portion 618 may also include a cylindrical shape, but with a smaller base than the top portion 610 and bottom portion 612 to define an open region 682 between the top portion 610 and bottom portion 612. The open region 682 receives the disc portion 650 of the dosing disc 112.

The top portion 610 includes one or more apertures for passing coffee into an open region 682. For example, the top portion 610 may include a top aperture 614a and a top aperture 614b (individually referred to as top aperture 614). The bottom portion 612 includes one or more apertures for passing coffee from the open region 682 to outside of the dispenser 108, such as a bottom aperture 616a and a bottom aperture 616b (individually referred to as bottom aperture 616).

The dosing disc 112 includes a disc portion 650, a disc connector portion 652, and the knob 160. The disc portion 650 may include a cylindrical shape with an (e.g., pie slice shaped) open region 654 and a connector aperture 652 that meets the open region 654. The connector aperture 652 receives the connector portion 618 of the dosing filter 110. The disc connector portion 652 connects the disc portion 650 with the knob 160. The disc connector portion 652 may include a hollow cylindrical shape with an open side. The disc connector portion 652 defines an open region 684 between the disc portion 650 and knob 160 for receiving the bottom portion 612 of the dosing filter 110. The knob 160 may include a hollow cylindrical shape to allow coffee to pass through an opening in the knob 160.

When the dosing filter 110 is attached with the dosing disc 112 to form the dispenser 108, the bottom portion 612 of the dosing filter 110 is inserted at the open side of the disc connector portion 652. The connector portion 618 of the dosing filter 110 is inserted within the connected aperture 652 of the disc portion 650 through the open region 654 of the disc portion 650. The disc portion 650 is in the open region 682 between the top portion 610 and the bottom portion 612 of the dosing filter. The bottom portion 612 is in the open region 684 between the disc portion 650 and the knob 160.

As the dosing disc 112 is turned via the knob 160 relative to the dosing filter 110, coffee is dispensed from the coffee storage container 100. For example, when the open region 654 of the disc portion 650 is below a top aperture 614 of the top portion 610, a dose of coffee in the internal chamber 140 of the container body 102 is transferred through the top aperture 614 to the open region 654. The size of the open region 654 controls how much coffee is allowed to pass through the top aperture 614, and thus controls the size of the dose. The coffee within the open region 654 at this stage sits on the bottom portion 612 because the top aperture 614 is not aligned with the bottom aperture 616 of the bottom portion 612. This prevents coffee from directly passing through the dosing filter 110 and thus helps to ensure that coffee is dispensed in controlled doses. As the dosing disc 112 is further turned and the open region 654 of the disc portion 650 is rotated to above a bottom aperture 616 of the bottom portion 612, the coffee in the open region 654 is transferred through the bottom aperture 616. The coffee then passes through the knob 160 and is dispensed by the coffee storage container 100. The top aperture 614, bottom aperture 616, and open region 654 of the disc portion 650 may include a similar shape, such as a pie slice shape, to facilitate the transfer of coffee through the dispenser 108. Further turning the knob 160 (e.g., in either direction) will result in another dose of coffee being dispensed in a similar fashion.

FIGS. 7A, 7B, 7C, 7D, 7E, and 7F show transfer of coffee through the dispenser 108, in accordance with one or more embodiments. The dispenser 108 dispenses a dose of coffee for every half turn of the dosing disc 112. The relative positions of the top apertures 614a and 614b (shown by solid lines), the bottom apertures 616a and 616b (shown by short dashed lines), and the open region 654 (shown long dashed lines) of the dosing disc 112 are shown from a top view of the dispenser 108. From this view, the top apertures 614 and bottom apertures 616 are not aligned with each other. The position of the open region 654 is controlled by the turning of the dosing disc 112.

Figure 7A:
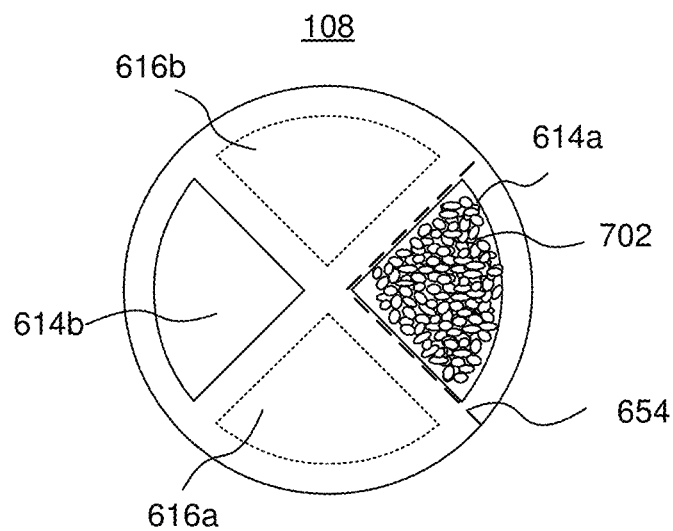
FIGS. 7A, 7B, 7C, 7D, 7E, and 7F show transfer of coffee through a dispenser, in accordance with one or more embodiments
Figure 7B:
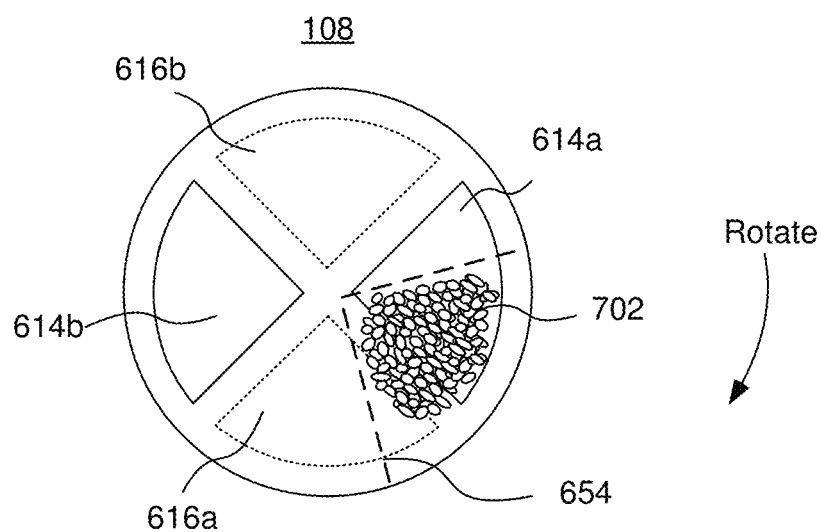
Figure 7C:
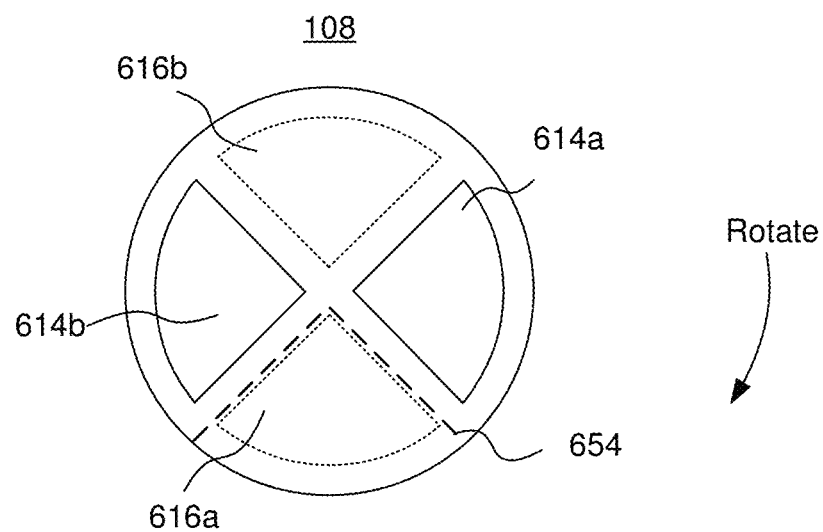

In FIG. 7A, the open region 654 is aligned with the top aperture 614a to allow a dose 702 of coffee to pass through the top aperture 614a into the open region 654. In FIG. 7B, the dosing disc 112 is rotated in a clockwise direction, and the dose 702 in the open region 654 moves with the rotation. As the open region 654 moves over the bottom aperture 616a, the dose 702 passes through the bottom aperture 616a and is dispensed from the dispenser 108. In FIG. 7C, the dosing disc 112 is further rotated in the clockwise direction. When the open region 654 is over the bottom aperture 616a or rotated further, the dose 702 has passed through the bottom aperture 616a and is fully dispensed from the dispenser 108.

Figure 7D:
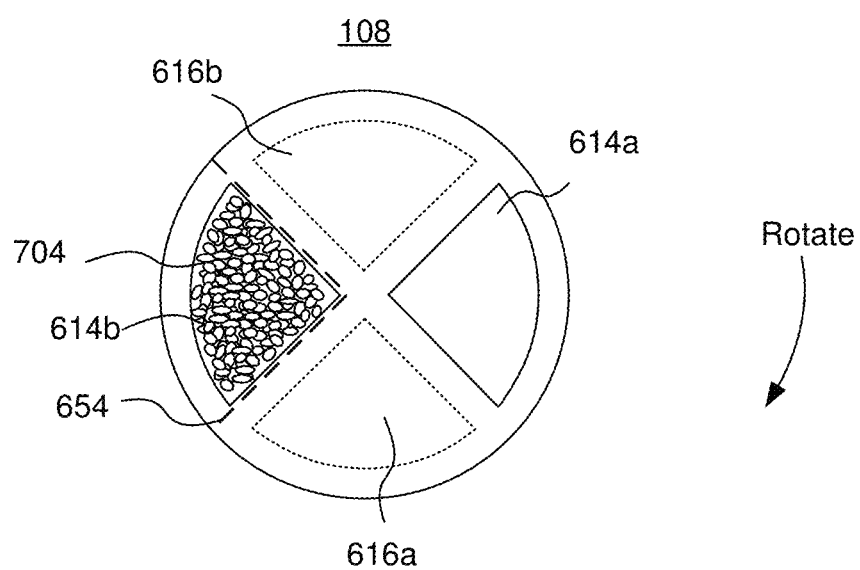
Figure 7E:
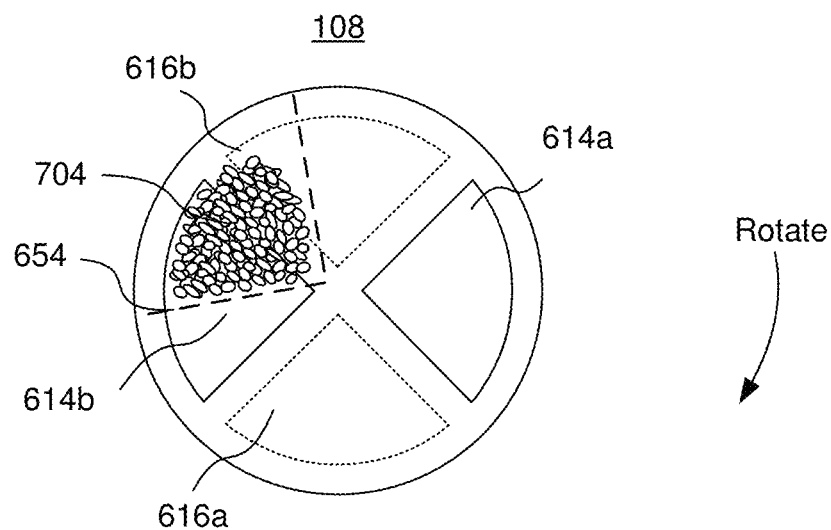
Figure 7F:
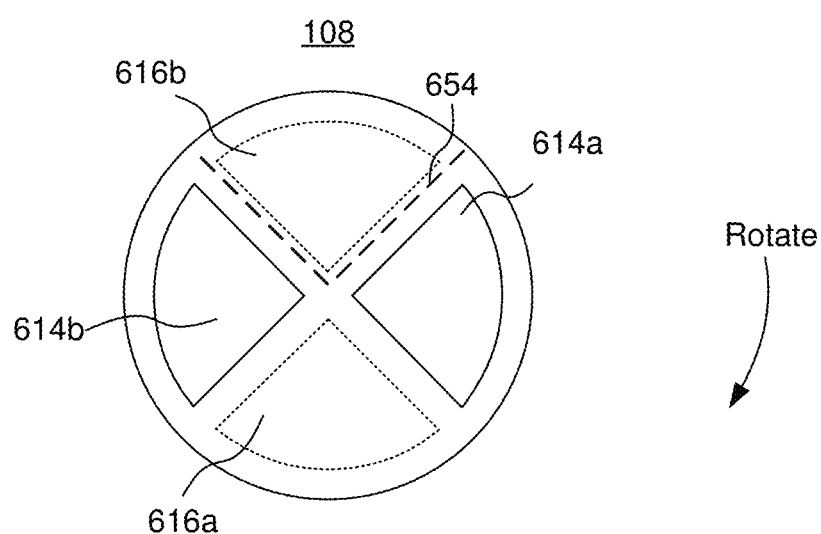

In FIG. 7D, the dosing disc 112 is further rotated in the clockwise direction. The open region 654 is aligned with the top aperture 614b to allow another dose 704 of coffee to pass through the top aperture 614b into the open region 654. In FIG. 7E, the dosing disc 112 is rotated in the clockwise direction, and the dose 704 in the open region 654 moves with the rotation. As the open region 654 moves over the bottom aperture 616b, the dose 704 passes through the bottom aperture 616b and is dispensed from the dispenser 108. In FIG. 7F, the dosing disc 112 is further rotated in the clockwise direction. When the open region 654 is over the bottom aperture 616b or rotated further, the dose 704 has passed through the bottom aperture 616b and is fully dispensed from the dispenser 108. Although rotation in the clockwise direction is shown, the dispensing may also be achieved via rotation in the counter-clockwise direction.

FIGS. 8A, 8B, 8C, and 8D show transfer of coffee through the dispenser 808, in accordance with one or more embodiments. The dispenser 808 is an embodiment of the dispenser 108. The dispenser 108 dispenses a dose of coffee for full turn of the dosing disc 112.

Furthermore, the dispenser 108 reduces or eliminates contact with outside air for the coffee in the internal chamber 140 while coffee is being dispensed. This is achieved by the dosing disc 112 preventing a direct path for air to flow from the outside into the storage space 146 at all times, regardless of the rotated position of the dosing disc 112. The relative positions of a top apertures 814 (shown by solid lines), a bottom aperture 816 (shown by short dashed lines), and the open region 654 (shown long dashed lines) of the dosing disc 112 are shown from a top view of the dispenser 808. Furthermore, the bottom portion 612 of the dosing filter 110 includes regions 890a and 890b defined between the top aperture 814 and bottom aperture 816 (from the top view) that are at least as large as the open region 654. The size of the regions 890a and 890b ensures that, for all positions of the open region 654 of the dosing disc 112, the open region 654 is not simultaneously open to both the top aperture 814 and bottom aperture 816. This reduces or eliminates airflow from outside of the coffee storage container 100 into the internal chamber 140. In contrast, in FIG. 7B for example, the open region 654 is open to both the top aperture 614a and bottom aperture 616a. This may allow some airflow into the internal chamber 140 during the dispensing of the coffee (e.g., if the dosing disc 112 is kept in this position and the lid 104 is not attached).

Figure 8A:
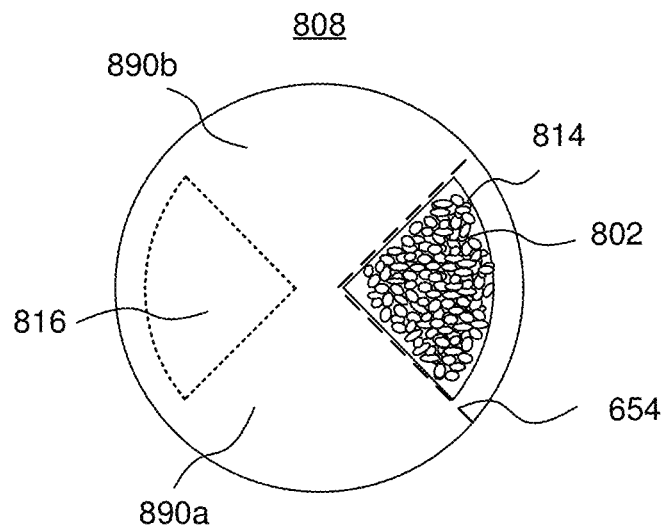
FIGS. 8A, 8B, 8C, and 8D show transfer of coffee through the dispenser 808, in accordance with one or more embodiments.
Figure 8B:
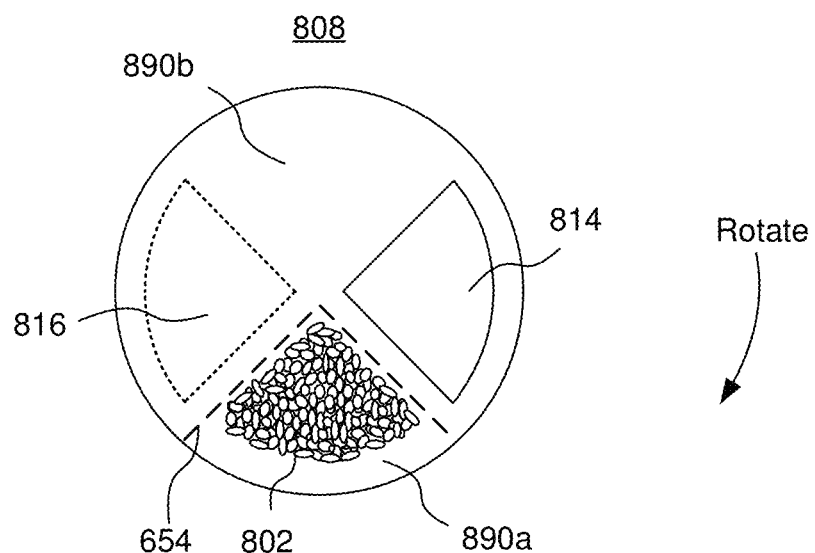
Figure 8C:
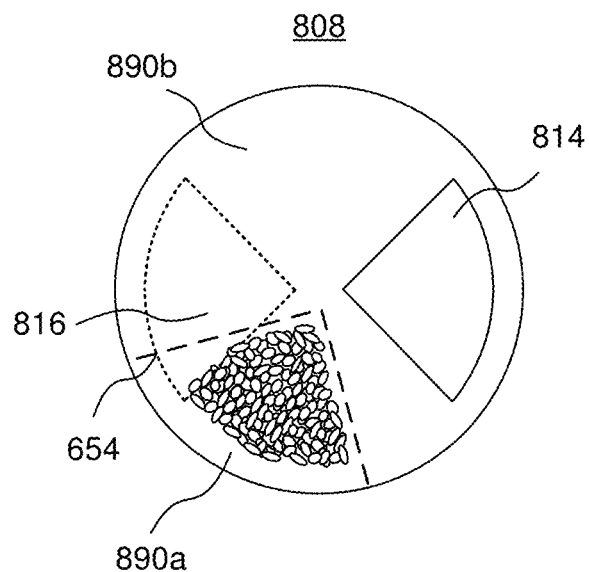
Figure 8D:
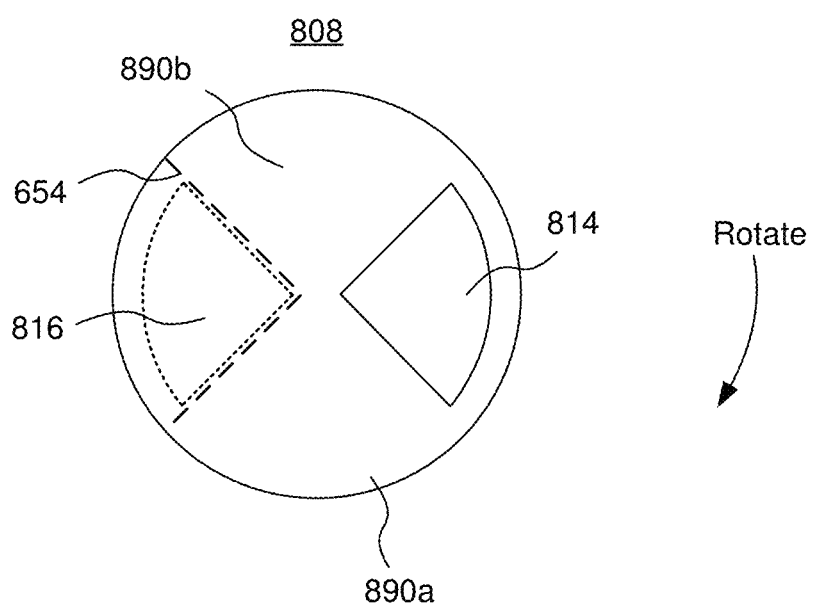

In FIG. 8A, the open region 654 is aligned with the top aperture 814 to allow a dose 802 of coffee to pass through the top aperture 814 into the open region 654. In FIG. 8B, the dosing disc 112 is rotated in a clockwise direction, and the dose 802 in the open region 654 moves with the rotation and passes over the region 890a. In FIG. 8C, the open region 654 moves over the bottom aperture 816. The dose 802 passes through the bottom aperture 816 and is dispensed from the dispenser 808. In FIG. 8D, the dosing disc 112 is further rotated in the clockwise direction. When the open region 654 is over the bottom aperture 816 or rotated further, the dose 802 has passed through the bottom aperture 816 and is fully dispensed from the dispenser 808.

Upon reading this disclosure, those of skill in the art will appreciate still additional alternative structural and functional designs for a storage container through the disclosed principles herein. For example, the container discussed herein may be used to store other types of materials (e.g., spices, roasted food items, etc.) that should be kept away from air, humidity, or light. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A coffee storage container, comprising:
    a container body defining an internal chamber;
    a dispenser including a top side located within the internal chamber, the top side providing a resting surface for coffee stored in the internal chamber, the dispenser configured to dispense the coffee through a bottom side of the dispenser, wherein the dispenser is attached with the container body via external threads on the dispenser and internal threads on an inner surface of the container body; and
    a floating ceiling located within the internal chamber above the dispenser, the floating ceiling resting on the coffee stored in the internal chamber and moving downwards with a top level of remaining coffee in the internal chamber as the coffee is dispensed through the bottom side of the dispenser, the floating ceiling and the top side of the dispenser defining a storage space for the coffee that decreases in volume as the coffee is dispensed by the dispenser.

2. The coffee storage container of claim 1, wherein the floating ceiling creates an air seal within the storage space and downwards movement of the floating ceiling prevents airflow into the storage space as the coffee is dispensed by the dispenser.

3. The coffee storage container of claim 1, wherein the floating ceiling has a thickness between 0.75 to 1 inch.

4. The coffee storage container of claim 1, wherein the floating ceiling weighs between 4 and 5 ounces.

5. The coffee storage container of claim 1, wherein the floating ceiling comprises a polymer material.

6. The coffee storage container of claim 1, wherein the dispenser dispenses doses of the coffee.

7. The coffee storage container of claim 1, wherein the dispenser comprises:
    a dosing filter including:
        a top portion including a top aperture; and
        a bottom portion including a bottom aperture; and
    a dosing disc including a disc portion between the top and bottom portions of the dosing filter, the disc portion opening and closing the top and bottom apertures as the disc portion is rotated with respect to dosing filter, the disc portion defining an open region that, as the disc portion is rotated with respect to the dosing filter, receives a dose of coffee from the storage space via the top aperture and dispenses the dose of coffee via the bottom aperture.

8. The coffee storage container of claim 7, wherein, for all rotated positions of the disc portion, the disc portion closes at least one of the top aperture and the bottom aperture.

9. The coffee storage container of claim 7, wherein the top portion includes a plurality of top apertures and the bottom portion includes a plurality of bottom apertures.

10. The coffee storage container of claim 7, wherein:
    the dosing disc further comprises a knob connected to the disc portion;
    the bottom portion of dosing filter is between the dosing disc and the knob;
    the knob extends below an open bottom of the container body through which the dispenser is inserted;
    rotation of the knob causes rotation of the disc portion; and
    the coffee dispensed by the dispenser passes through an opening in the knob.

11. The coffee storage container of claim 7, wherein:
    the dosing filter includes a connector portion between the top and bottom portions;
    the dosing disc includes a connector aperture that receives the connector portion; and
    the connector portion is inserted within the connector aperture through the open region in the dosing disc.

12. The coffee storage container of claim 1, wherein the container body is opaque.

13. The coffee storage container of claim 1, further comprising a coffee level indicator that indicates an amount of coffee in the storage space.

14. The coffee storage container of claim 13, wherein:
the coffee level indicator comprises a cord attached to the floating ceiling and extending outside of the container body;
the coffee storage container further comprises a lid that covers the internal chamber at an open top of the container body; and
the cord extends through an aperture of the lid.

15. The coffee storage container of claim 1, further comprising a base that covers the bottom side of the dispenser when attached to the container body, the base including a first gasket that provides an air seal between an open top of the base and an outer surface of the container body when the base is attached to the container body.

16. The coffee storage container of claim 15, wherein the outer surface of the container body includes a second gasket that provides an air seal between an inner surface of the base and the outer surface of the container body when the base is attached to the container body.

17. A coffee storage container, comprising:
a container body defining an internal chamber;
a dispenser located within the internal chamber, the dispenser providing a resting surface for coffee stored in the internal chamber, the dispenser configured to dispense the coffee through a bottom side of the dispenser, wherein the dispenser is attached with the container body via external threads on the dispenser and internal threads on an inner surface of the container body; and
a floating ceiling located within the internal chamber above the dispenser, the floating ceiling resting on the coffee stored in the internal chamber and moving downwards with a top level of remaining coffee in the internal chamber as portions of the coffee are dispensed through the bottom side of the dispenser, downwards movement of the floating ceiling preventing airflow into the storage space as the coffee is dispensed by the dispenser.

18. A coffee storage container, comprising:
a container body defining an internal chamber;
a dispenser including a top side located within the internal chamber, the top side providing a resting surface for coffee stored in the internal chamber, the dispenser configured to dispense the coffee through a bottom side of the dispenser; and
a floating ceiling located within the internal chamber above the dispenser, the floating ceiling resting on the coffee stored in the internal chamber and moving downwards with a top level of remaining coffee in the internal chamber as the coffee is dispensed through the bottom side of the dispenser, the floating ceiling and the top side of the dispenser defining a storage space for the coffee that decreases in volume as the coffee is dispensed by the dispenser;
a lid that covers the internal chamber at an open top of the container body; and
a coffee level indicator that indicates an amount of coffee in the storage space, wherein the coffee level indicator comprises a cord attached to the floating ceiling and extending outside of the container body, wherein the cord extends through an aperture of the lid.

* * * * *